United States Patent [19]

Livingstone et al.

[11] Patent Number: 5,450,433
[45] Date of Patent: Sep. 12, 1995

[54] LASER ARRANGEMENT INCLUDING EFFECIENCY IMPROVING GAS RESERVOIRS IN THERMAL INSULATION

[75] Inventors: Ewan S. Livingstone; Graeme L. Clark, both of Essex, England

[73] Assignee: English Electric Valve Company Limited, Essex, England

[21] Appl. No.: 163,559

[22] Filed: Dec. 9, 1993

[30] Foreign Application Priority Data

Jan. 20, 1993 [GB] United Kingdom ............... 9301085

[51] Int. Cl.⁶ ............................................. H01S 3/227
[52] U.S. Cl. ......................................... 372/56; 372/59; 372/60; 372/34
[58] Field of Search .................. 372/34, 56, 57, 58, 372/59, 60, 33

[56] References Cited

U.S. PATENT DOCUMENTS

| | | | |
|---|---|---|---|
| 3,585,524 | 6/1971 | Silfvast | 372/56 |
| 3,855,543 | 12/1974 | Timmermans et al. | 372/60 |
| 4,689,796 | 8/1987 | Wright | 372/33 |
| 4,907,242 | 3/1990 | Maitland et al. | 372/56 X |
| 4,907,243 | 3/1990 | Menown et al. | 372/33 X |
| 5,283,800 | 2/1994 | Suzuki et al. | 372/60 |

FOREIGN PATENT DOCUMENTS

2198283  6/1988  United Kingdom .
WO87/05158  9/1987  WIPO .

OTHER PUBLICATIONS

"Influence of Molecular Gases on the Output Characteristics of Copper Vapor Laser", Japanese J. of App. Phys., vol. 25, No. 11, Nov. 1986, pp. 1677–1679, Huang et al.

"A Gold-Vapor Laser Using Ne-H2 as Buffer Gas", Appl. Phys. & Photophysics and Chemistry, vol. 44, No. 1, Sep. 1987, pp. 57–59, Huang et al.

Primary Examiner—Rodney B. Bovernick
Assistant Examiner—Hemang Sanghavi
Attorney, Agent, or Firm—Lowe, Price, LeBlanc & Becker

[57] ABSTRACT

A laser arrangement includes an outer envelope and an inner alumina tube between which insulating material is located. The insulating material has a plurality of apertures therein in its transverse end faces, the aperture being arranged at each end on two circle of similar radii. Hydrogen reservoirs are located within the apertures. During operation of the laser arrangement, the reservoirs become heated causing hydrogen to be evolved and diffused through to the laser active medium, improving the efficiency of the laser operation. When laser action ceases, the arrangement cools and hydrogen returns to the reservoirs. Efficiency enhancing gases other than hydrogen may be used in the arrangement.

10 Claims, 1 Drawing Sheet

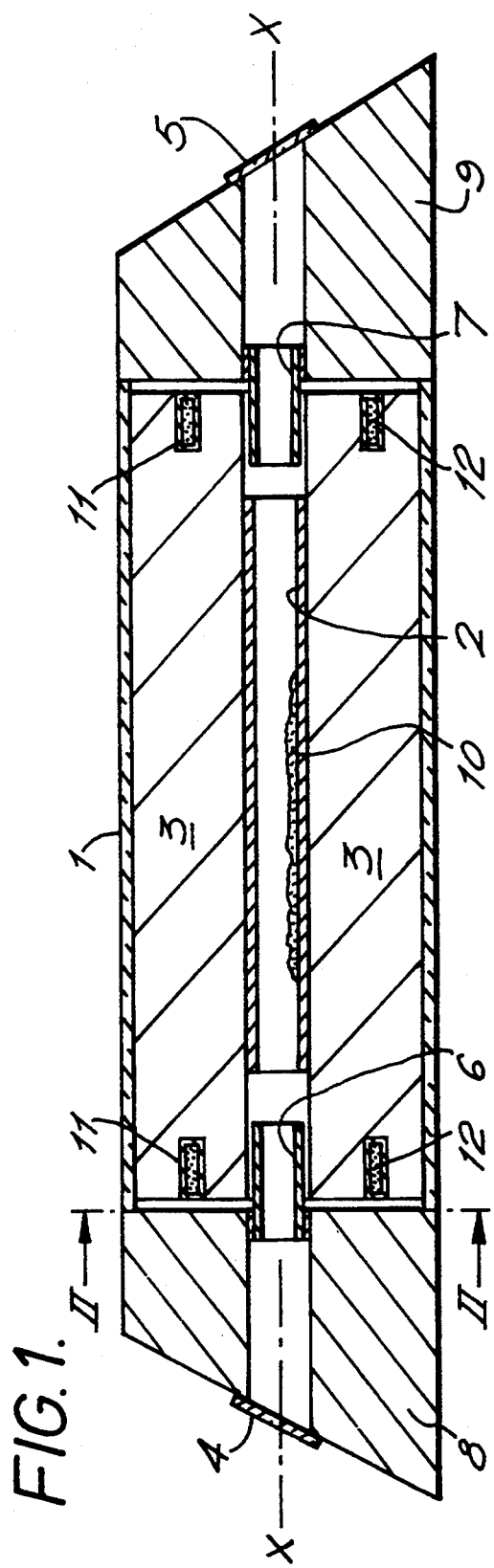
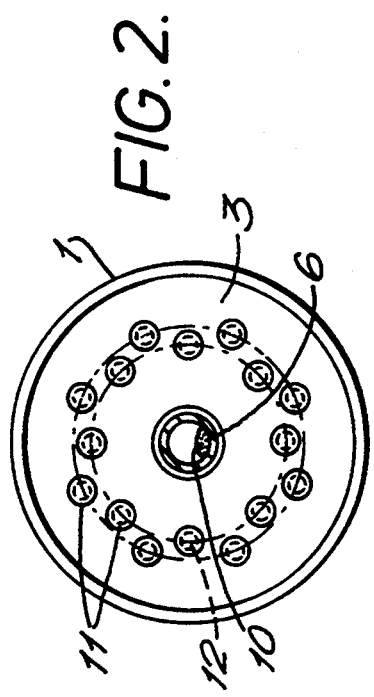

LASER ARRANGEMENT INCLUDING EFFECIENCY IMPROVING GAS RESERVOIRS IN THERMAL INSULATION

FIELD OF THE INVENTION

This invention relates to laser arrangements and more particularly, but not exclusively, to arrangements in which the laser active medium is a metal vapour such as, for example, copper vapour.

BACKGROUND TO THE INVENTION

Laser apparatus generally requires that in addition to the material which is, or is to form, the laser active medium, a buffer gas or mixture of gases is also included within a discharge tube to enable sufficient gas pressure to be maintained for laser action to be possible. It has been found that the introduction of small quantities of hydrogen into a buffer gas, such as neon, may improve the operating efficiency of the laser in some cases, although the mechanism by which such an introduction facilities the laser action is not at present clearly understood. Other gases such a deuterium, nitrogen and oxygen may also give increased efficiency when added to a laser active medium and buffer gas. The quantities required for such efficiency enhancing gases to be effective are generally much smaller than the main buffer gas or gases, a typical arrangement having partial pressure of one hundred times less than the main buffer gas pressure.

The present invention arose from a consideration of the use of hydrogen or other efficiency improving gases in laser arrangements.

SUMMARY OF THE INVENTION

According to the invention there is provided a laser arrangement comprising a laser envelope containing material which in use forms at least part of a laser active medium; a main buffer gas or mixture of gases; and reservoir means located within the laser envelope for delivering hydrogen, or some other gas the presence of which improvers laser efficiency, into the laser active medium and main buffer gas at a partial pressure dependent on the temperature of the reservoir means, which temperature is substantially solely determined by heating occurring within the envelope arising from the operation of the laser arrangement.

The efficiency improving gas may also constitute part of the buffer gas when released into the laser active medium but this is distinct from the "main" buffer gas or gases without which laser radiation could not be generated under normal operating conditions.

By employing the invention, heating of the reservoir is provided by the normal process taking place within the arrangement to obtain laser radiation, for example, it may be achieved by electrical discharges established within the laser envelope. The temperature is substantially solely determined by this as no separate provision is made for heating the reservoir means. There is no requirement therefore to include complicated heating circuits to supply current to resistor elements at particular times in relation to the laser operating cycle. Use of the invention enables heating of the reservoir means to its optimum temperature to be achieved automatically during operation of the laser arrangement, reducing the likelihood of malfunctions. The temperature of the reservoir means is determined by the geometry of the laser arrangement and the temperature required within the laser active medium to achieve the generation of laser radiation under steady state operating conditions. The temperature distribution throughout the arrangement may therefore be calculated and hence the optimum position or positions for the reservoir means.

The location of the reservoir means, and hence the temperature which it reaches during normal operation of the laser arrangement, enables the amount of hydrogen or other gas released into the envelope to be controlled to reach an optimum partial pressure at which dynamic equilibrium is established. For example, in a copper vapour laser arrangement, the laser active medium is maintained at a temperature in the region of 1500° C. and is surrounded by insulating layers of material to give a temperature at the outer surface of the arrangement of the order of 200° C. Where it is wished to use hydrogen to improve laser efficiency, this can be supplied using a reservoir containing titanium hydride. The optimum partial pressure of hydrogen within the laser active medium is achieved when the reservoir is heated to approximately 600° C. As the temperature gradient across the radius of the laser arrangement may be calculated, the reservoir or reservoirs containing the titanium hydride may be located at a desired radius to produce a particular volume of hydrogen evolved from the reservoirs.

By suitably locating the reservoir means, it is possible therefore to accurately release the required amount of hydrogen or other gas into the laser active medium without complex monitoring equipment. Also, as the reservoir means is located within the envelope, the whole structure may be made robust as the reservoirs can be located within the normal envelope configuration and do not require, for example, side arms to house them. There is no need to permit external access to the reservoir means for example, for the supply of heating current.

When the laser arrangement ceases operation, temperatures within the envelope drop. As the reservoir temperature also decreases, hydrogen, or other efficiency enhancing gas, within the tube is collected by the reservoir means as it combines with the remaining reservoir material. Thus, relatively small amounts of a hydride, say, may be used to give long operating life times before replenishment is required.

The invention is particularly advantageously applied where the laser active medium is a metal vapour but it may also be used for other types of laser.

Preferably, the reservoir means comprises a plurality of reservoirs, These may be symmetrically located around the longitudinal axis of the laser arrangement and advantageously are spatially disposed on a circle in a plane transverse to the longitudinal axis. In one particular embodiment of the invention, the reservoirs are located on two concentric circles and in the same plane transverse to the longitudinal axis, to give a particularly compact distribution of reservoirs.

The reservoir means may consist of apertures within a normally provided component of the laser arrangement within which a reservoir material, such as a hydride or a deuteride, is located. However, advantageously, the reservoir means comprises a container within which material which dispenses hydrogen or said some other gas is contained. This may be, for example, a thin walled palladium vessel through which gas molecules may pass, dynamic equilibrium thus being substantially unaffected by its presence. Containers permit easy handling of the reservoirs when assembling or servicing the laser arrangement.

In one particularly advantageous embodiment of the invention, the reservoir means is located between electrodes within the laser envelope between which, during use, an electrical discharge is established. Thus, the reservoir may be made accessible to the laser active medium for the evolved gas or gases along only a short pathway.

Advantageously, the laser envelope is sealed off such that there is no flow through of buffer gas during use. A laser arrangement in accordance with the invention is well suited to a sealed off mode of operation as once the reservoir material is located within the envelope there is no need for replenishment during normal operational use.

Preferably, a buffer gas or mixture of gases comprises a noble gas or gases such as neon, helium and argon. Advantageously, the buffer gas has a partial pressure within the range of 5 torr to 1 atmosphere and the hydrogen or said some other gas has a partial pressure in the range of 0.1 to 10 torr.

BRIEF DESCRIPTION OF DRAWINGS

One way in which the invention may be performed is now described by way of example with reference to the accompanying drawings, in which:

FIG. 1 is a schematic longitudinal section through a metal vapour laser arrangement; and FIG. 2 is a transverse section along the line II—II shown on FIG. 1.

DESCRIPTION OF PREFERRED EMBODIMENT

With reference to FIGS. 1 and 2, a copper vapour laser arrangement in accordance with the invention has a substantially cylindrical configuration and includes an outer glass vacuum envelope 1 coaxially arranged about the longitudinal axis X—X and surrounding an alumina tube 2. Thermally insulating material 3 is positioned between the envelope 1 and tube 2 and comprises a compacted alumina substance. End windows 4 and 5 are located on the axis X—X which is also the optical axis along which laser radiation is generated during use. The arrangement further includes two electrodes 6 and 7 at each end of the alumina tube 2 and between which, in operation, a discharge is established to provide pumping and excitation energy to the laser active medium. Each of the electrodes 6 and 7 is connected to metal end pieces 8 and 9 respectively by which electrical connection is made to the electrodes. The active laser medium in this case is copper vapour. Prior to use, therefore, copper 10, in the form of powder or metallic pieces, is distributed along the interior of the alumina tube 2.

A plurality of cylindrical apertures 11 is formed in the insulating material 3 at its end faces adjacent the metal end pieces 8 and 9, the apertures 11 being symmetrically arranged about the axis X—X. FIG. 2 illustrates the group of apertures 11 at the left hand end as shown, those at the right hand end being arranged in a similar pattern. The apertures are extensive in a parallel direction to the axis X—X and are arranged on two concentric circles being equidistant and those on the inner circle being staggered with respect to those on the outer circle. Each aperture has a diameter of approximately 2 mm and contains a palladium walled container 12 which, in this embodiment of the invention, contains powdered titanium hydride. Gaps between the end faces of the insulating material 3 and metal end pieces 8 and 9 permit a path for gas atoms and molecules to travel between the containers 12 and the interior of the alumina tube 2. In an alternative embodiment (not shown) there are no gaps between the insulating material and end pieces, the gas diffusing from the containers 12 through the surrounding insulation to the laser amplification volume.

The laser envelope 1 contains neon buffer gas at a pressure of 10 Torr. The envelope 1 is sealed such that there is no flow of buffer gas through it under operating conditions.

During operation of the arrangement, repeated electrical discharges between the electrodes 6 and 7 cause the interior of the arrangement to become heated to a temperature of approximately 1500° C. At these temperatures the copper metal 10 vaporises and is excited to obtain a population inversion and hence generate laser radiation.

As the interior temperature of the laser arrangement rises on commencement, the thickness and thermal conduction properties of the insulating material 3 creates a temperature gradient in a radial direction, such that the outer surface of the vacuum envelope reaches and remains at a temperature of approximately 200° C. The temperature at the two radii at which the containers 12 are located also gradually increases until after approximately ten minutes or so, they reach a steady state temperature of about 600° C. As the temperature of the titanium hydride increases, hydrogen is evolved which passes through the gaps between the insulating material 3 and end pieces 8 and 9 into the laser amplification volume. The partial pressure of the hydrogen increases as the temperature of the reservoir material rises until eventually a steady state pressure is attained when the final temperature of 600° C. is reached. At this temperature, the partial pressure of hydrogen in the active laser volume is approximately 0.5 torr. The hydrogen contributes to the lasing mechanism and the operation of the laser arrangement to increase its operating efficiency.

When the laser arrangement is switched off, the interior defined by the glass envelope 1 slowly cools. As the titanium hydride in the containers 12 cools, it takes up hydrogen within the laser volume until gradually substantially all the hydrogen with the arrangement has returned to the reservoirs 12.

If it is wished to use deuterium as the efficiency enhancing element, a suitable material for use in the reservoirs is titanium deuteride.

Although the invention is described with reference to a copper vapour laser, it is equally applicable to gold or some other metal, or mixture of metal, vapours and to other types of laser. Similarly the reservoir material is chosen to evolve the desired efficiency enhancing gas. The placement of a reservoir or reservoirs is determined by the thermal gradients set up under operating conditions and the temperature at which the required amount of the gas is liberated.

The efficiency enhancing gas may be one, or a mixture of, hydrogen, deuterium, nitrogen and oxygen.

We claim:

1. A laser arrangement comprising: a substantially cylindrical laser envelope containing material which in use forms at least pan of a laser active medium; a main buffer gas or mixture of gases; thermal insulating means; reservoir means located within said thermal insulating means for delivering an efficient improving gas, the presence of which improves laser efficiency, into said laser active medium and said main buffer gas or mixture of gases at a partial pressure dependent on a temperature of said reservoir means, said temperature is substantially solely determined by heating occurring within said envelope arising from the operation of said arrangement; said reservoir means comprises a plurality of reservoirs spatially disposed on a circle in a plane transverse to a longitudinal axis of said laser envelope; said plurality of reservoirs contain material which dispenses said efficiency improving gas when said reservoirs are heated; and said reservoir means being located within said thermal insulating means and within said envelope such that the location of said reservoir means on a temperature gradient across said insulating means determines the temperature of said reservoir means.

2. An arrangement as claimed in claim 1 wherein said efficiency improving gas is one or more of: hydrogen, deuterium, nitrogen and oxygen.

3. An arrangement as claimed in claim 1 wherein said laser active medium is a metal vapour.

4. An arrangement as claimed in claim 1 wherein said reservoirs are disposed on a plurality of coaxial circles arranged coaxially about one another and said longitudinal axis.

5. An arrangement as claimed in claim 1 and including electrodes within said laser envelope between which, during use, an electrical discharge is established and wherein said reservoir means is located between said electrodes.

6. An arrangement as claimed in claim 1 wherein said laser envelope is sealed off such that there is no flow through of buffer gas during use.

7. An arrangement as claimed in claim 1 wherein where said efficiency improving gas is hydrogen, said reservoir means includes a hydride material.

8. An arrangement as claimed in claim 1 wherein where said efficiency improving gas is deuterium, said reservoir means includes deuteride.

9. An arrangement as claimed in claim 1 wherein said buffer gas or mixture of gases comprises a noble gas or gases.

10. An arrangement as claimed in claim 1 wherein said buffer gas or mixture of gases has a pressure within the range 5 torr to 1 atmosphere and said efficiency improving gas has a pressure in the range of 0.1 to 10 torr.

* * * * *